United States Patent
Brouillette (10) Patent No.: US 11,922,234 B2
(45) Date of Patent: Mar. 5, 2024

(54) MULTI-AGENT RING-BUFFER

(71) Applicant: Roku, Inc., San Jose, CA (US)

(72) Inventor: Patrick Alan Brouillette, Tempe, AZ (US)

(73) Assignee: Roku, Inc., San Jose, CA (US)

( * ) Notice: Subject to any disclaimer, the term of this patent is extended or adjusted under 35 U.S.C. 154(b) by 42 days.

(21) Appl. No.: 17/485,909

(22) Filed: Sep. 27, 2021

(65) Prior Publication Data

US 2022/0012109 A1     Jan. 13, 2022

Related U.S. Application Data (63) Continuation of application No. 16/542,915, filed on Aug. 16, 2019, now Pat. No. 11,132,240.

(51) Int. Cl.
*G06F 9/54* (2006.01)
*G06F 9/50* (2006.01)

(52) U.S. Cl.
CPC ............ *G06F 9/544* (2013.01); *G06F 9/5077* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,948,082 A | 9/1999 | Ichikawa | |
| 7,716,396 B1 | 5/2010 | Liu et al. | |
| 2005/0120351 A1 | 6/2005 | Bonet | |
| 2005/0188129 A1 | 8/2005 | Abdelilah | |
| 2016/0357508 A1 | 12/2016 | Moore et al. | |

*Primary Examiner* — Syed A Roni
(74) *Attorney, Agent, or Firm* — Sterne, Kessler, Goldstein & Fox P.L.L.C.

(57) ABSTRACT

Embodiments included herein generally relate to processing data samples. More particularly, embodiments relate to processing a plurality of data samples using a multi-agent ring-buffer and a plurality of agents configured to communicate with the ring-buffer to process each of the plurality of data samples.

20 Claims, 6 Drawing Sheets

MULTI-AGENT RING-BUFFER

RELATED APPLICATION

This application is a continuation of U.S. patent application Ser. No. 16/542,915, filed Aug. 16, 2019, now allowed as U.S. Pat. No. 11,132,240, and is herein incorporated by reference in its entirety.

TECHNICAL FIELD

Embodiments included herein generally relate to processing data samples. More particularly, embodiments relate to processing a plurality of data samples using a multi-agent ring-buffer and a plurality of agents configured to communicate within the ring-buffer to process each of the plurality of data samples.

BACKGROUND

In a data processing flow, content may be processed by a number of components in communication with one another. In these data processing flows, the components are commonly structured in a sequential fashion, and to facilitate communications between the components, the components may store data in one or more buffers. Commonly this processing flow is implemented with data queues. However, when queues are used, it may be difficult to determine exactly how much data is contained in the processing flow between the input and output stages. For example, the individual processing agents within the data flow may mis-report the amount of data in their queues, and the amount of data they are currently processing. For real-time processing systems, it is critical to know exactly how much data is contained within the flow so the system may predict, with high precision, when data at the input of the flow will exit the output of the flow. In addition, knowing exactly how much data is within a flow, and how much data each individual stage of the flow has at its input assists the system in properly scheduling processing resources to guarantee a predictable, low latency from the input of the flow to the output.

BRIEF DESCRIPTION OF THE DRAWINGS

The accompanying drawings, which are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Provided herein are system, apparatus, article of manufacture, method and/or computer program product embodiments, and/or combinations and sub-combinations thereof, for using a multi-agent ring-buffer and a plurality of agents configured to communicate with the ring-buffer to process each of the plurality of data samples.

In some embodiments, the present disclosure is directed to a device. The device may include a ring-buffer configured to store a plurality of data samples in a plurality of partitions of the ring-buffer. Each data sample may be stored in a respective partition of the plurality of partition. The device may further include a plurality of agents configured to communicate within the ring-buffer to process each of the plurality of data samples.

In some embodiments, the present disclosure is directed to a method. The method may include: writing, by a first agent of a plurality of agents, data samples into respective partitions of a plurality of partitions of a ring-buffer; reading, by a second agent of the plurality of agents, the data samples from the respective partitions; processing, by the second agent, the data samples to generate second data samples; writing, by the second agent, the second data samples into the respective partitions; and outputting, by a third agent of the plurality of agents, the second data samples from the respective partitions.

In some embodiments, the present disclosure is directed to a non-transitory, tangible computer-readable device having instructions stored thereon that, when executed by at least one computing device, causes the at least one computing device to perform operations. The operations may include: writing, by a first agent of a plurality of agents, data samples into respective partitions of a plurality of partitions of a ring-buffer; reading, by a second agent of the plurality of agents, the data samples from the respective partitions; processing, by the second agent, the data samples to generate second data samples; writing, by the second agent, the second data samples into the respective partitions; and outputting, by a third agent of the plurality of agents, the second data samples from the respective partitions.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

DETAILED DESCRIPTION OF THE INVENTION

Provided herein are system, method, computer program product and/or device embodiments, and/or combinations thereof, for processing a plurality of data samples using a multi-agent ring-buffer and a plurality of agents configured to communicate within the ring-buffer to process each of the plurality of data samples.

Figure 1:
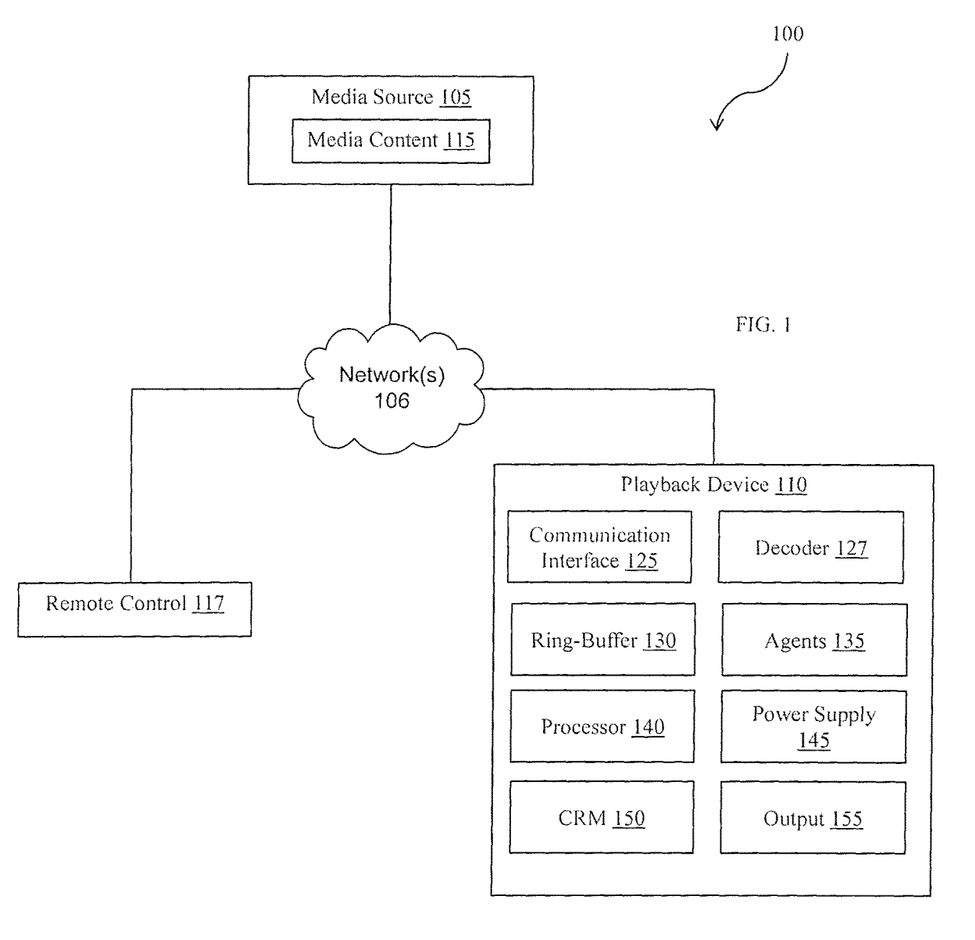
FIG. 1 illustrates an environment for communicating data samples between a plurality of devices, according to some embodiments.

FIG. 1 illustrates a system for providing audio content via a playback device. Referring to FIG. 1, a system 100 may include a media source 105 in communication with a playback device 110. The playback device 110 may be, without limitation, a media player, television, a wireless device, a smartphone, a tablet computer, a laptop/mobile computer, a handheld computer, a server computer, an in-appliance device, Internet of Things (IoT) device, a wireless speaker, a streaming media player, a game console, an audio effects box, and/or an audio/video receiver. In some embodiments, the media source 105 may be located in the same listening environment as the playback device 110. Additionally, or alternatively, the media source 105 may be located remotely from the playback device 110. The playback device 110 and the media source 105 may communicate via a communication network(s) 106. The communication network 106 may include any or all of a wired and/or wireless private network, personal area network (PAN), Local-Area Network (LAN), a Wide-Area Network (WAN), or the Internet. In some embodiments, the system 100 may also include a remote control 117 for controlling one or more operations of the playback device 110. For example, the remote control 117 may be a voice-activated remote control configured to transmit audio commands to the playback device 110.

In some embodiments, media content 115 may be stored on the media source 105 and transmitted to the playback device 110, such that the playback device 110 may reproduce the media content 115. The playback device 110 may include a communication interface 125 for receiving media content 115 from the media source 105, a decoder 127 for decoding the media content 115, a ring-buffer 130 for storing data, and a plurality of agents 135 in communication with the ring-buffer 130, a processor 140, a power supply 145, a non-transitory, tangible computer readable memory (CRM) 150 used to store any number of functional components that are executable by the processor 140 and/or one or more of the plurality of agents 135, and an output 155. The communication interface 125 may include one or more interfaces and hardware components for enabling communication with various other devices. For example, communication interface 125 facilitate communication through one or more of the Internet, cellular networks, and wireless networks (e.g., Wi-Fi, cellular). In some implementations, these functional components comprise instructions or programs that are executable by the processor 140 and and/or one or more of the plurality of agents 135 that, when executed, specifically configure the processor 140 and/or one or more of the plurality of agents 135 to perform the actions described herein. In addition, the CRM 150 stores data used for performing the operations described herein. The output 155 may be, for example, an audio output of a television or wireless speaker, or the like. In some embodiments, the ring-buffer 130 may be configured to provide for precise scheduling of every audio sample sent to the output 155, e.g., a digital to analog converter of the output 155.

In some embodiments, the ring-buffer 130 may be a data structure that uses a single, fixed-size buffer. For example, the ring-buffer 130 may be a data structure having a fixed size of $2^n$ data samples of storage capacity. The ring-buffer 130 may be divided into $2^n$ data samples, with each data sample being represented by a respective partition. The ring-buffer 130 may be configured to store data samples of a single type within the ring-buffer 130. For example, the data samples may be single channel audio samples, two-channel audio samples, four-channel audio samples, eleven-channel audio samples, to name a few examples. In some embodiments, the type of data sample stored by the ring-buffer 130 may be defined by a user. Although the ring-buffer 130 is described as being used to process audio data samples, it should be understood by those of ordinary skill in the arts that the systems described herein may be used to process any data sample that is processed in a multi-stage data flow, such as, but not limited to, messages, characters, network packets, pointers to system memory, etc.

Based on the type of data sample being stored thereon, the ring-buffer 130 may be configured to operate at a corresponding frequency. For example, for two-channel audio samples, the ring-buffer 130 may be configured to operate at a frequency of 48 kHz. In some embodiments, the ring-buffer 130 may be configured to operate at a fixed delay. That is, the ring-buffer 130 may be configured to output an incoming data sample after, for example, 10 ms, where an input agent may write samples into the ring-buffer 130 and an output agent may output the samples 10 ms later. In some embodiments, one or more intervening agents may process the data samples between the input agent and the output agent.

In some embodiments, the ring-buffer 130 may manage and track which agents are communicating within the ring-buffer 130, e.g., reading data from or writing data to the ring-buffer 130. For example, each agent of the plurality of agents 135 may be assigned a starting position with respect to the ring-buffer (e.g., a starting partition on the ring-buffer 130), and the ring-buffer 130 may be configured to track a position of each agent 135 relative to all of the other agents 135. By tracking a starting position of each agent 135, the ring-buffer may manage (e.g., add or remove agents) based on the respective position of each of the plurality of agents 135. In some embodiments, the positions of each agent 135 communicating within the ring-buffer 130 may be continuously incremented irrespective of the size of the ring-buffer 130. The number of partitions within the ring-buffer 130 may be N, and as such, an agent 135 at position P of a continuously incrementing position may be calculated as P modulo N, as should be understood by those of ordinary skill in the art. Alternatively, an agent at position P of a continuously incrementing position may be calculated as P bitwise AND with ($2^n-1$), as should be understood by those of ordinary skill in the art. In some embodiments, the plurality of agents 135 may be spaced apart from one another, such that the plurality of agents 135 may operate on a plurality of data samples within the ring-buffer 130 at time.

In some embodiments, the plurality of agents 135 may include one or more agents used in an audio flow process. The plurality of agents 135 may include a combination of one or more of the following: a sound source, such a microphone, a user interface (UI) sound source, a content source (e.g., a media content source); an audio renderer; an audio sink; digital signal processing and control (DSPC) unit; a pulse code modulator (PCM); a PCM combined with a presentation time stamp; a precision PCM; a mixer; and an output device, such as a speaker or the like. It should be understood that these are merely example agents that may communicate with the ring-buffer 130, and that other agents are further contemplated in accordance with aspects of the present disclosure.

In some embodiments, each agent 135 may be configured to operate on a currently available data sample of the ring-buffer 130 between the current partition and an adjacent agent 135 ahead of it in the ring-buffer 130. In this way, each agent 135 may be configured to operate on as many data samples as possible without interfering with the functions of any of the other agents 135. In further embodiments, each of the plurality of agents 135 may be configured to operate on a respective number of samples stored in the ring-buffer 130 at a time. For example, a first agent of the plurality of agents may be configured to operate on, for example, three (3) data samples at a time, whereas a second agent may be configured to operate on, for example, four (4) data samples, at a time. In some embodiments, the plurality of agents 135 may be positioned with respect to one another such that the number of data samples the respective agent is configured to operate on is the same as a distance between a agent and a preceding agent.

In some embodiments, the plurality of agents 135 may be configured to move with respect to the ring-buffer 130. In this way, the plurality of agents 135 may read and/or write data within a given partition of the ring-buffer 130 in a choreographed manner. In one example illustrated in FIG. 2, a first agent 235(1) of the plurality of agents 135 may be a combination of an audio renderer and an audio sink, a second agent 235(2) of the plurality of agents 135 may be a mixer, a third agent 235(3) of the plurality of agents 135 may be a DSPC, and a fourth agent 235(4) of the plurality of agents 135 may be an output device. In this example, the combination of the audio renderer and the audio sink 235(1) may write first data into a given partition of the ring-buffer 130. In some embodiments, the first data may be data that is received from the media source 105 and rendered by the combination of the audio renderer and the audio sink 235(1). In some embodiments, the mixer 235(2) may read the first data from the ring-buffer 130 and process the first data to generate second data, and the mixer 235(2) may write the second data into the given partition of the ring-buffer 130. Processing the first data may include mixing the first data with one or more other audio signals.

Figure 2:
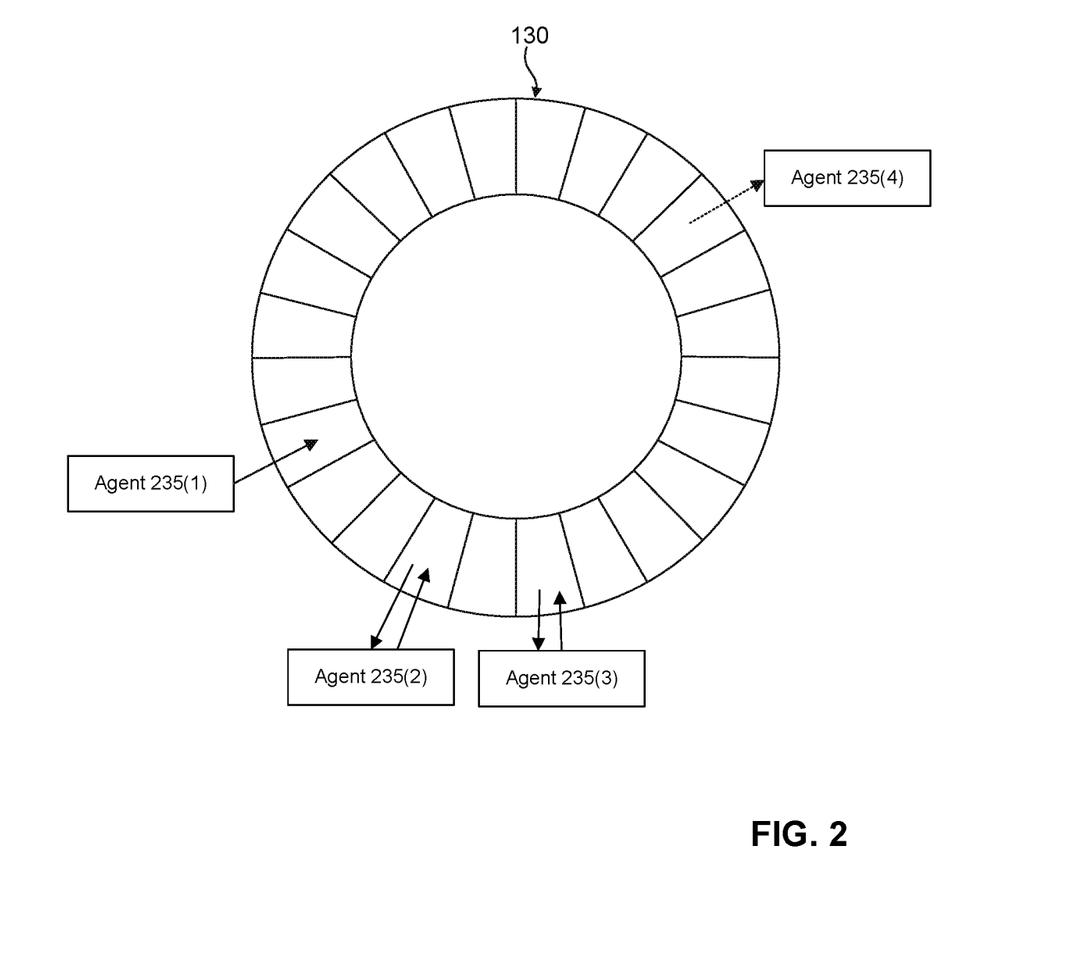
FIG. 2 illustrates an example multi-agent ring-buffer, according to some embodiments.

Subsequently, the DSPC 235(3) may read the second data from the ring-buffer 130 and process the second data to generate third data. Processing the second data may include any digital signal processing techniques as should be understood by those of ordinary skill in the art. The DSPC 235(3) may then store the third data into the given partition of the ring-buffer 130. Lastly, the output device 235(4) may read the third data and generate an audible output. In this example, the first, second, and third agents 235(1)-(3) may be configured to track a distance to the fourth agent 235(4). That is, each of the non-output agents may be configured to track a distance to an output agent. As a result, the first, second, and third agents 235(1)-(3) are configured to know when the samples stored within the ring-buffer 130 are scheduled to be output by the fourth agent 235(4). By reading and writing data to and from the ring-buffer 130, the present disclosure eliminates the need to use multiple buffers used in conventional audio processing systems and the shortcomings associated with using multiple buffers (e.g., unpredictable processing delay and loss of data synchronization, for example).

To operate in the choreographed manner, each of the plurality of agents 135 may be assigned a particular position with respect to the ring-buffer 130, as discussed above. For example, the plurality of agents 135 may positioned such that the plurality of agents 135 move in a clock-wise direction with respect to the ring-buffer 130. However, it should be understood by those of ordinary skill in the art that the plurality of agents 135 may positioned such that the plurality of agents 135 move in a counter clock-wise direction with respect to the ring-buffer 130 as well. In further embodiments, each of the plurality of agents 135 may be configured to move and operate in relation to one another. That is, the plurality of agents 135 may be configured to read, write, and/or read and process data stored in the ring-buffer based on a number of partitions having data stored thereon or available to have data written into. In some embodiments, the number of partitions available for any agent to process, e.g., read from or write to, is calculated as a position within the ring-buffer 130 of a preceding agent in the data flow minus a position of the current within the ring-buffer 130. In further embodiments, a number of partitions available to an input agent of the plurality of agents is calculated as a position of an output agent of the plurality of agents within the ring-buffer 130 plus a size of the ring-buffer 130 minus a position of the input agent.

By configuring the plurality of agents 135 to move and operate in relation to one another, the plurality agents 135 operate in a sequential manner, thereby ensuring that the plurality of agents 135 avoid operating on data stored in the ring-buffer 130 out of order, which would cause disruptions in the data flow.

In some embodiments, one or more of the plurality of agents 135 may be configured to read and process data (e.g., modify the data) stored in the ring-buffer 130 when a first minimum number of partitions have data stored thereon and to remain inactive until the first minimum number of partitions is satisfied. Using the example shown in FIG. 2, the mixer 235(2) may read and process data stored in the ring-buffer 130 when the input 235(1) has stored, for example, audio samples in ten (10) partitions. After reading and processing the data from the ten (10) partitions, the mixer 235(2) may be configured to write the modified data back into the ring-buffer 130 and move to a partition after the last partition of the first minimum number of partitions. The DSPC 235(3) may operate in a similar manner as the mixer 235(2).

Furthermore, in some embodiments, one or more of the plurality of agents 135 may be configured to read data from the ring-buffer 130 when a second minimum number of partitions have data stored thereon and to remain inactive until the second minimum number of partitions is satisfied. In some embodiments, after reading the data from the second minimum number of partitions, the one or more of the plurality of agents 135 may move along the ring-buffer 130 to a partition after the last partition of the second minimum number of partitions. Again using the example shown in FIG. 2, the output 235(4) may read the data stored in the ring-buffer 130 when the DSPC 235(3) has stored, for example, audio samples in ten (10) partitions. After reading data from the ten (10) partitions, the output 235(4) may move to a partition after the last partition of the second minimum number of partitions.

Furthermore, in some embodiments, one or more of the plurality of agents 135 may be configured to write data to the ring-buffer 130 when a third minimum number of partitions are available in the ring-buffer 130 and to remain inactive until the third minimum number of partitions is satisfied. In some embodiments, after writing data into the third minimum number of partitions, the one or more of the plurality of agents 135 may move along the ring-buffer 130 to a partition after the last partition of the third minimum number of partitions. Again using the example shown in FIG. 2, the input agent 235(1) may write data in the ring-buffer when the output 235(4) has read, for example, ten (10) audio samples from the ring-buffer 130. After writing the ten (10) samples into the ring-buffer 130, the input 235(1) may move to a partition after the last partition of the third minimum number of partitions. By configuring the plurality of agents 135 to move with respect to one another, the present disclosure advantageously In some embodiments, the one or more agents of the plurality of agents 135 may be configured to determine whether the minimum number of partitions (e.g., the first minimum number, the second minimum number, or the third minimum number) is available to the one or more agents 135 and to go into an inactive state until the minimum number of partitions are available. Alternatively, in some embodiments, when the one or more agents of the plurality of agents 135 are in the inactive state, the one or more agents of the plurality of agents 135 may be configured to go into an active state after a preceding agent performs its functions with respect to the ring-buffer 130 and to determine whether the minimum number of partitions is available. Once the minimum number of partitions is available, the one or more agents of the plurality of agents 135 may perform the operations described herein. By configuring the plurality of agents 135 to go into an inactive state, the present disclosure advantageously reduces the amount of resources required to operate the plurality of agents 135, as should be understood by those of ordinary skill in the arts.

Figure 3:
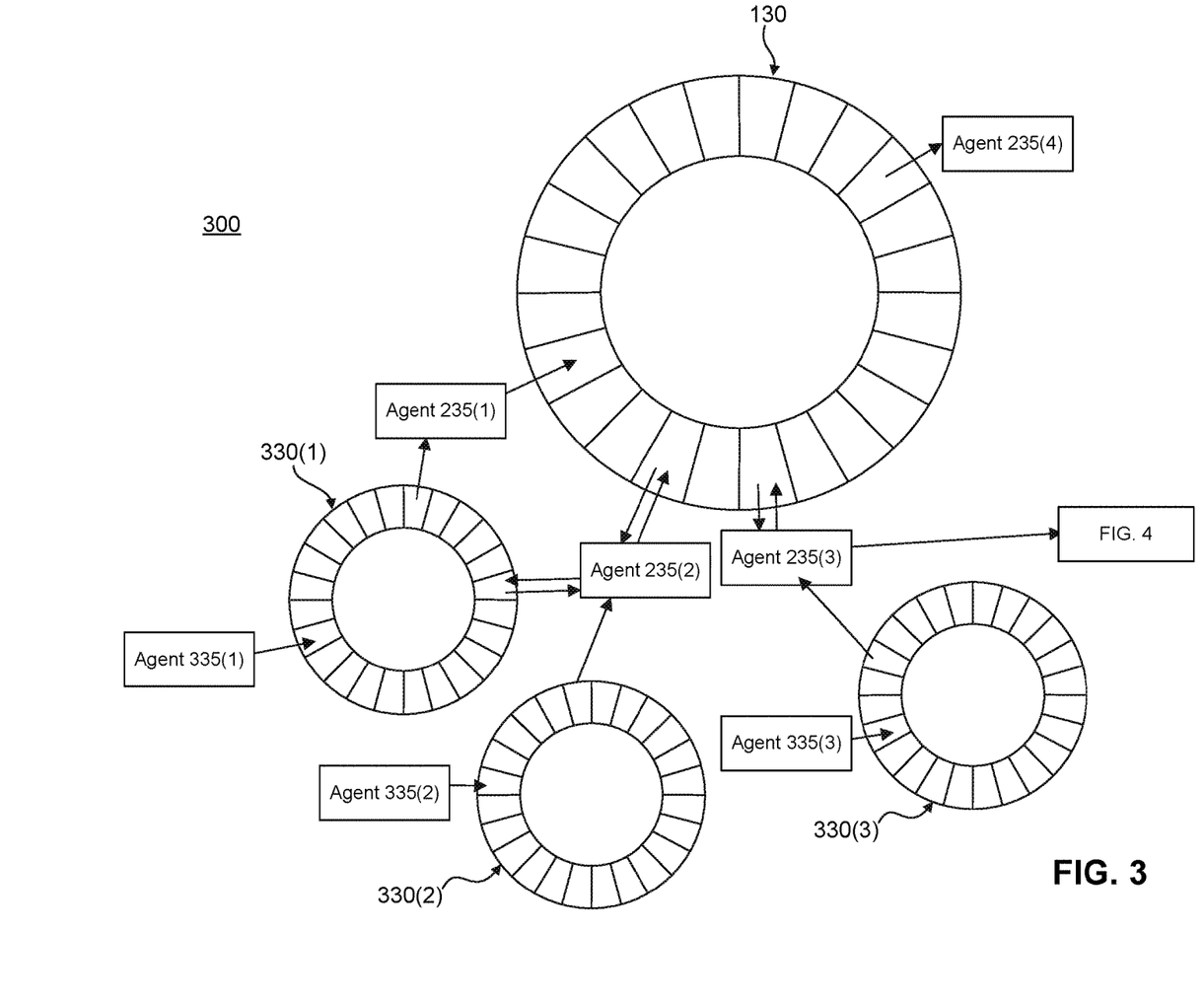
FIGS. 3 and 4 illustrate a pipeline of a multi-agent ring-buffers, according to some embodiments.
Figure 4:
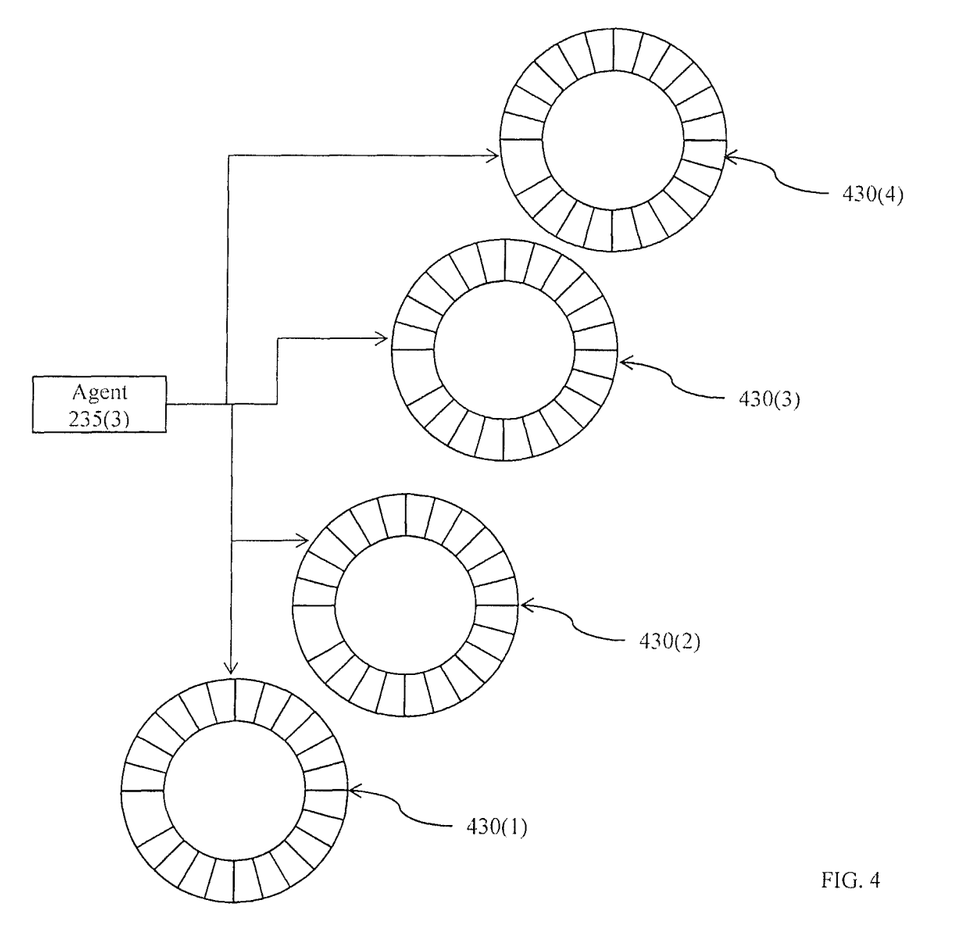

FIGS. 3 and 4 illustrate an environment 300 for implementing a pipeline of multi-agent ring-buffers in accordance with aspects of the present disclosure. As illustrated in FIGS. 3 and 4, the environment 300 may include a plurality of multi-agent ring-buffers 330(1)-330(3), 430(1)-430(4) and a second plurality agents 335(1)-335(3), as well as the ring-buffer 130 and the plurality of agents 235(1)-235(4) discussed with respect to FIGS. 1 and 2 above. In some embodiments, the agent 335(1) may be a decoder, e.g., the decoder 127 of FIG. 1, and the ring-buffer 330(1) may be configured to store decoded audio samples from the agent 335(1). It should be understood by those of ordinary skill the art that the decoded data samples may be, for example, 2-channel audio samples, 11-channel audio samples, etc., and the ring-buffer 330(1) may be configured based on a type of the decoded data samples, as discussed herein. As illustrated in FIG. 3, the agent 235(1) may read data from the buffer 330(1) and store the read data in the ring-buffer 130. Likewise, the agent 235(2) may read and write data to and from the buffer 330(1), and store the read data in the ring-buffer 130, as discussed in further detail. To achieve this, the agents 335(1), 235(1), 235(2) may communication with the ring-buffer 330(1) in a similar manner discussed above with respect to FIGS. 1 and 2. For example, in some embodiments, the agents 335(1), 235(1), and 235(2) may be configured to move and operate on data stored in the ring-buffer 330(1) in relation to one another.

In some embodiments, the agent 335(2) may be, for example, a user interface (UI) notification sound source configured to store UI sounds and to write audio samples of such UI sounds in the ring-buffer 330(2), which may, in turn, be accessed by the agent 235(2). In some embodiments, the agent 235(2) may modify, e.g., mix, the sound samples stored in the ring-buffer 130 by the agent 235(1), the sound samples stored in the ring-buffer 330(1) by the agent 335(1), and the sound samples stored in the ring-buffer 330(2) by the agent 335(2), and store the resultant mixed audio sample in the ring-buffer 130, as should be understood by those of ordinary skill in the art. To achieve this, the agents 335(2), 235(2) may communication with the ring-buffers 330(1), 330(2), respectively, in a similar manner discussed above with respect to FIGS. 1 and 2. For example, in some embodiments, the agents 335(2), 235(2) may be configured to move and operate on data stored in the ring-buffer 330(2) in relation to one another.

In some embodiments, the agent 335(3) may include a microphone, and the ring-buffer 330(3) may be configured to store data from the microphone into a partition of the ring-buffer 330(3), which may, in turn, be accessed by the agent 235(3). In further embodiments, the agent 335(3) may include a plurality of microphones, and the agent 335(3) may be configured to consolidate data samples from the plurality of microphones into a single audio sample, and store the consolidated audio sample sin the ring-buffer 330(3). As a result, the agent 235(3) may read a single output from the ring-buffer 330(3), rather than a separate output from each respective microphone. The agent 235(3) may be configured to distinguish between audio samples received from a user, e.g., audio commands received using a remote control or microphone array (e.g., the remote control 117 of FIG. 1) and audio samples received from an output of the agent 235(4). That is, the agent 235(3) (e.g., a DSPC) may be configured to filter out the output of the speaker 235(4), as should be understood by those of ordinary skill in the art. In some embodiments, the agents 335(3), 235(3) may communication with the ring-buffer 330(3) in a similar manner discussed above with respect to FIGS. 1 and 2. For example, the agents 335(3), 235(3) may be configured to move and operate on data stored in the ring-buffer 330(3) in relation to one another.

As illustrated in FIG. 4, the agent 235(3) may be configured to provide a respective output to a plurality of ring-buffers 430(1)-430(4). The plurality of ring-buffers 430(1)-430(4) may be used for an input monitor, an output monitor, a beamformed microphone, an echo-cancelled microphone, or a raw microphone array. It should be understood by those of ordinary skill in the arts that these are merely examples of devices coupled to the agent 235(3), and that output devices are further contemplated in accordance with aspects of the present disclosure.

Thus, in some embodiments, a pipeline of multi-agent ring-buffers may include a first ring-buffer (e.g., ring-buffer 130 of FIGS. 1 and 2) configured to communicate with a first plurality of agents (e.g., agent 235(1)-235(4) of FIG. 2), a second ring-buffer (e.g., ring-buffer 330(1) of FIG. 3) configured to communicate with a second plurality of agents (e.g., agent 335(1) of FIG. 3 and agents 235(1)-(2) of FIG. 2), a third ring-buffer (e.g., ring-buffer 330(2) of FIG. 3) configured to communicate with a third plurality of agents (e.g., agent 335(2) of FIG. 3 and agent 235(2) of FIG. 2), a fourth ring-buffer (e.g., ring-buffer 330(3) of FIG. 3) configured to communicate with a fourth plurality of agents (e.g., agent 335(3) of FIG. 3 and agent 235(3) of FIG. 2), a set of fifth ring-buffers (e.g., ring-buffers 430(1)-(4) of FIG. 4) configured to communicate with the agent 235(2) of FIG. 2.

Figure 5:
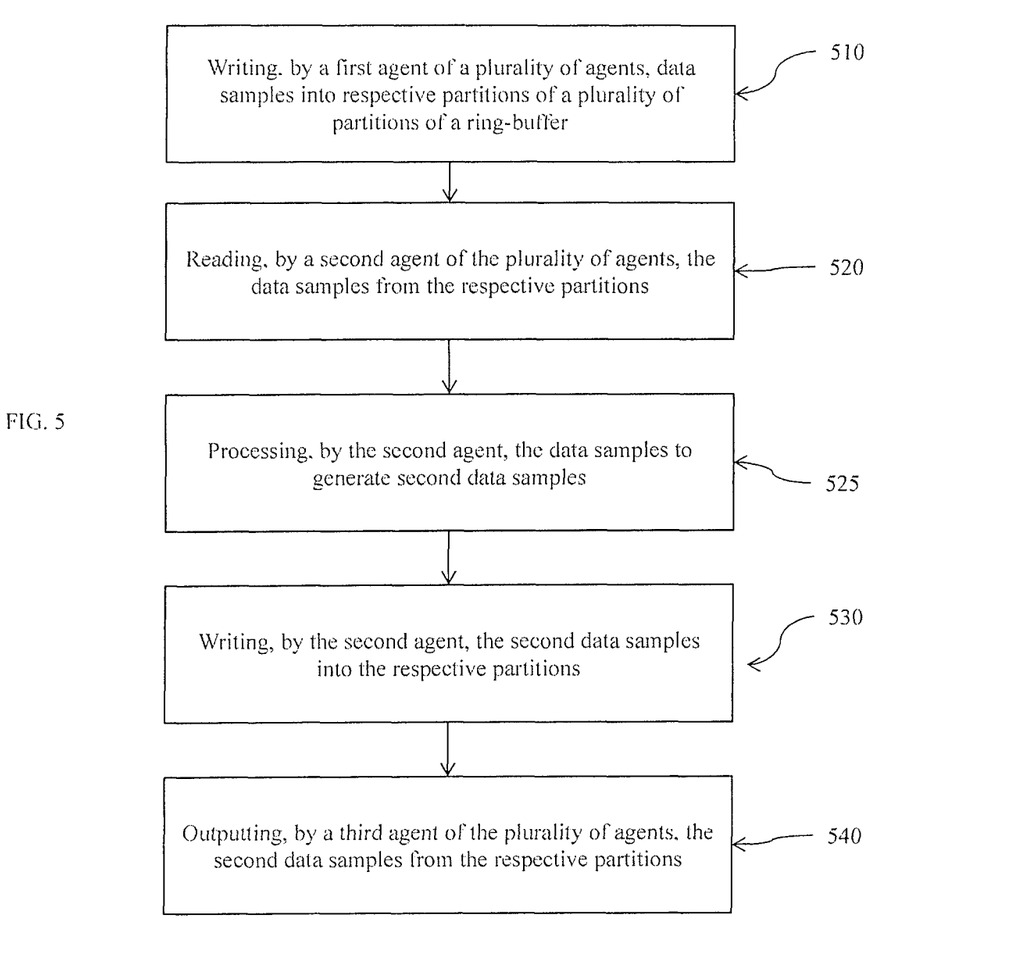
FIG. 5 illustrates a flowchart for processing data samples, according to some embodiments.

FIG. 5 illustrates a flowchart for processing data samples, according to some embodiments. In 510, a first agent (e.g., agent 235(1) of FIG. 2) may write data samples into respective partitions of a plurality of partitions of a ring-buffer (e.g., ring-buffer 130 of FIG. 1).

In 520, a second agent (e.g., agent 235(2) or agent 235(3) of FIG. 2) may process the data samples from the respective partitions to generate second data samples.

In 525, the second agent may process the data samples to generate second data samples, and in 530, the second agent may write the second data samples back into the respective partition it read the data samples from.

In 540, a third agent (e.g., agent 235(4) of FIG. 2) may output the second data samples from the respective partitions.

It will be appreciated by those skilled in the art that the functionality of the speaker devices described herein may be performed by other entertainment devices, such as a media player, television, a wireless device, a smartphone, a tablet computer, a laptop/mobile computer, a handheld computer, a server computer, an in-appliance device, streaming media player, a game console, an audio/video receiver, and so forth.

Example Computer System

Figure 6:
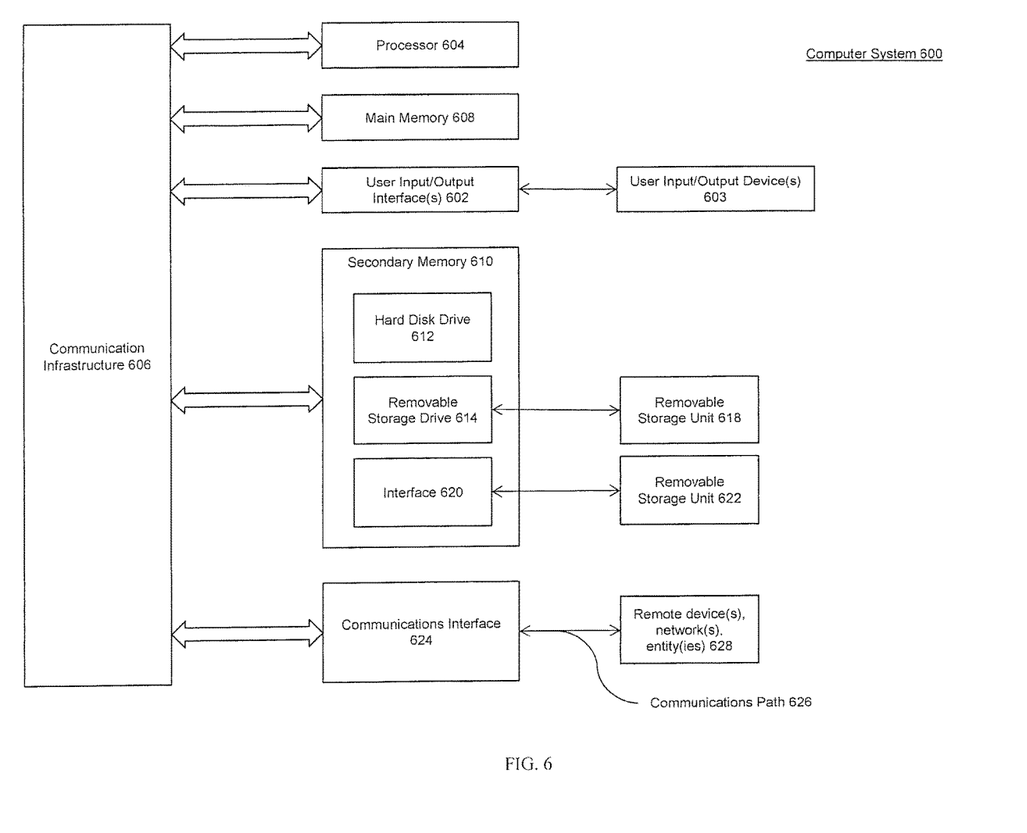
FIG. 6 illustrates an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

Computer system 600 also includes user input/output device(s) 603, such as monitors, keyboards, pointing devices, etc., which communicate with communication infrastructure or bus 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A device comprising:
   a ring-buffer including a plurality of partitions configured to store a plurality of audio data samples;
   an additional ring-buffer; and
   a plurality of agents configured to communicate within the ring-buffer or the additional ring-buffer, wherein at least some of the plurality of agents are used in an audio flow process, and wherein an agent of the plurality of agents reads an audio data sample from the additional ring-buffer and stores the audio data sample into the ring-buffer.

2. The device of claim 1, wherein the plurality of audio data samples includes at least one of a single channel audio data sample, a two-channel audio data sample, a four-channel audio data sample, and an eleven-channel audio data sample.

3. The device of claim 1, wherein the plurality of agents includes an input agent and an output agent, wherein the input agent writes audio data samples into the ring-buffer, and wherien the output agent produces an output at a fixed delay after the audio data samples are written into the ring-buffer by the input agent.

4. The device of claim 1, wherein the plurality of agents includes a first agent assigned to a first position of the ring-buffer, and a second agent assigned to a second position of the ring-buffer, wherein the first position and the second position are separated by a number of audio data samples, and the first agent operates on the number of audio data samples separating the first position and the second position.

5. The device of claim 1, wherein the ring-buffer includes N ordered partitions, an agent has a first position P1 at a first time instance, and has a second position P2 at a second time instance, and wherein the second position P2 is a continuously incrementing position calculated as P2 modulo N.

6. The device of claim 1, wherein the plurality of agents includes one or more agents selected from a sound source, a user interface (UI) sound source, a content source, an audio renderer, an audio sink, a digital signal processing and control (DSPC) unit, a pulse code modulator (PCM), a precision PCM, a mixer, an output device, a speaker, a decoder, and a microphone.

7. The device of claim 6, wherein the plurality of agents includes a first agent that includes a combination of the audio renderer and the audio sink, a second agent that includes the mixer, a third agent that includes the DSPC unit, and a fourth agent that includes the output device.

8. The device of claim 7, wherein the first agent writes a first audio data sample into a first partition of the ring-buffer, wherein the first audio data sample is received from a media source and rendered by the combination of the audio renderer and the audio sink included in the first agent;
   wherein the mixer of the second agent reads the first audio data sample from the ring-buffer and processes the first audio data sample to generate a second audio data sample;
   wherein the DSPC unit of the third agent reads the second audio data sample from the ring-buffer and processes the second audio data sample to generate a third audio data sample, wherein the third audio data sample into the ring-buffer; and
   wherein the output device of the fourth agent reads the third audio data sample and generates an audible output.

9. The device of claim 8, wherein the mixer of the second agent processes the first audio data sample to generate the second audio data sample by mixing the first audio data sample with one or more other audio signals.

10. The device of claim 1, wherein the ring-buffer is a first ring-buffer, and the device further includes a plurality of ring-buffers, and wherein an agent of the plurality of agents provides an audio data sample to one or more ring-buffers of the plurality of ring-buffers.

11. The device of claim 10, wherein the plurality of ring-buffers are used for at least one of an input monitor, an output monitor, a beamformed microphone, an echo-cancelled microphone, and a raw microphone array.

12. A method comprising:
    writing, by a first agent that includes a combination of an audio renderer and an audio sink, a first data sample into a first partition of a ring-buffer of a media device, wherein the first data sample is received from a media source and rendered by the combination of the audio renderer and the audio sink included in the first agent, and wherein the media device includes the ring-buffer and a plurality of agents including the first agent;
    reading, by a second agent that includes a mixer, the first data sample from the ring-buffer, processing the first data sample to generate a second data sample, and storing the second data sample into a second partition of the ring-buffer;
    reading, by a third agent that includes a digital signal processing and control (DSPC) unit, the second data sample from the ring-buffer, processing the second data sample to generate a third data sample, and storing the third data sample into a third partition of the ring-buffer; and
    reading, by a fourth agent that includes an output device, the third data sample, and generating an audible output from the third data sample.

13. The method of claim 12, wherein the processing the first data sample to generate the second data sample includes processing the first data sample to generate the second data sample by mixing the first data sample with one or more other audio signals.

14. The method of claim 12, wherein the first data sample includes an audio data sample, and wherein the audio data sample includes at least one of a single channel audio data sample, a two-channel audio data sample, a four-channel audio data sample, and an eleven-channel audio data sample.

15. The method of claim 12, wherein the first agent is assigned to a first position of the ring-buffer, and the second agent is assigned to a second position of the ring-buffer, wherein the first position and the second position are separated by a number of data samples, and the first agent operates on the number of data samples separating the first position and the second position.

16. A device comprising:
    a plurality of ring-buffers including a first ring-buffer and a second ring-buffer, wherein the first ring-buffer is configured to store a plurality of audio data samples; and
    a plurality of agents configured to communicate within the plurality of ring-buffers, wherein at least some of the plurality of agents are used in an audio flow process, and wherein a first agent of the plurality of agents reads an audio data sample from the first ring-buffer and stores the audio data sample into the second ring-buffer.

17. The device of claim 16, wherein a second agent of the plurality of agents provides an audio data sample to one or more ring-buffers of the plurality of ring-buffers.

18. The device of claim 16, wherein the plurality of ring-buffers are used for at least one of an input monitor, an output monitor, a beamformed microphone, an echo-cancelled microphone, and a raw microphone array.

19. The device of claim 16, wherein the plurality of agents include one or more agents selected from a sound source, a user interface (UI) sound source, a content source, an audio renderer, an audio sink, a digital signal processing and control (DSPC) unit, a pulse code modulator (PCM), a precision PCM, a mixer, an output device, a speaker, a decoder, and a microphone.

20. A non-transitory, computer-readable device medium having instructions stored thereon that, when executed by a media device, cause the media device to perform operations comprising:
  writing, by a first agent that includes a combination of an audio renderer and an audio sink, a first data sample into a first partition of a ring-buffer of the media device, wherein the first data sample is received from a media source and rendered by the combination of the audio renderer and the audio sink included in the first agent, and wherein the media device includes the ring-buffer and a plurality of agents including the first agent;
  reading, by a second agent that includes a mixer, the first data sample from the ring-buffer, processing the first data sample to generate a second data sample, and storing the second data sample into a second partition of the ring-buffer;
  reading, by a third agent that includes a digital signal processing and control (DSPC) unit, the second data sample from the ring-buffer, processing the second data sample to generate a third data sample, and storing the third data sample into a third partition of the ring-buffer; and
  reading, by a fourth agent that includes an output device, the third data sample, and generating an audible output from the third data sample.

* * * * *

UNITED STATES PATENT AND TRADEMARK OFFICE
CERTIFICATE OF CORRECTION

PATENT NO. : 11,922,234 B2  
APPLICATION NO. : 17/485909  
DATED : March 5, 2024  
INVENTOR(S) : Brouillette Page 1 of 1

It is certified that error appears in the above-identified patent and that said Letters Patent is hereby corrected as shown below:

In the Claims

In Column 11, Claim 3, Line 22, delete "wherien" and insert -- wherein --, therefor.

In Column 11, Claim 4, Line 28, delete "wherein" and insert -- and wherein --, therefor.

In Column 11, Claim 8, Line 61, delete "sample" and insert -- sample is stored --, therefor.

Signed and Sealed this  
Sixteenth Day of December, 2025

John A. Squires  
*Director of the United States Patent and Trademark Office*